United States Patent Office 3,542,710
Patented Nov. 24, 1970

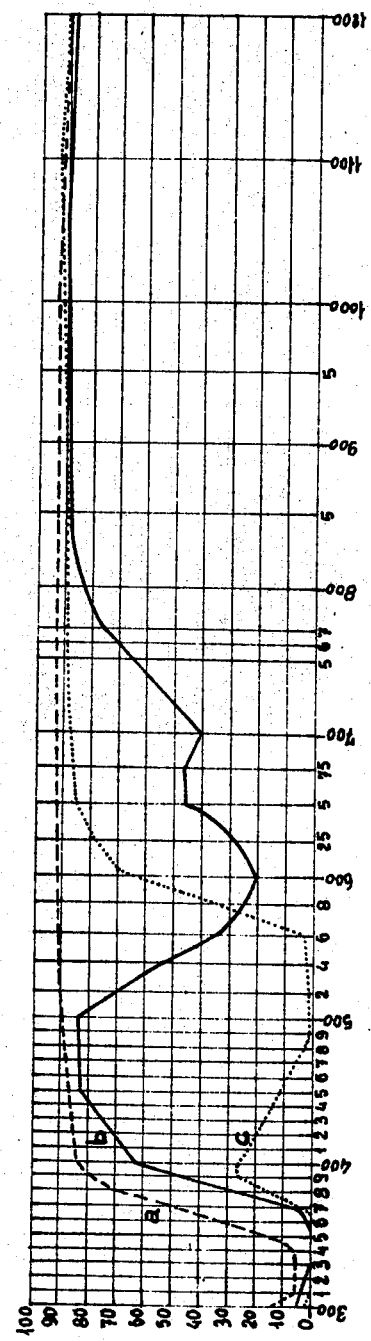

3,542,710
COLORED TRANSPARENT THERMOPLAS-
TIC SHEET BASED ON VINYL CHLO-
RIDE POLYMER
Flaviano Glatti, Mestre, Venice, Italy, assignor to
Montecatini Edison S.p.A., Milan, Italy
Filed Dec. 20, 1966, Ser. No. 603,388
Claims priority, application Italy, Dec. 12, 1965,
28,344/65
Int. Cl. A01g 9/14; C08f 29/18, 45/56
U.S. Cl. 260—23
7 Claims

ABSTRACT OF THE DISCLOSURE

A plant enclosure for controlling the growth of vegetables, flowers and fruit consists of a tinted polymeric sheet material of translucent character, essentially a composition of vinylchloride polymer, a thermal stabilizer, an ultraviolet absorber, a plasticizer, a lubricant and a dye.

My present invention relates to materials for the control of plant growth and a method involving the use of such materials.

It has become common practice to control the growth of plants of substantially all types by enclosing them in a so-called "greenhouse" or otherwise shielding a plant bed or individual plants from atmospheric conditions with the aid of translucent sheet materials, mainly glass, which maintain a predetermined humidity within the enclosed space and prevent this space from being subjected to temperature extremes, while admitting sufficient useful light energy to promote or control plant germination, development and growth.

For the most part, the translucent glass sheets used for this purpose must be placed in frames and mounted in highly reinforced structures to overcome disadvantages arising from the weight of the translucent material. Furthermore, when synthetic resins are used in foil or plate form to replace glass, the saving of weight and the lower cost are balanced by poor optical characteristics of the resin. Thus it has not been possible heretofore, to my knowledge, to control adequately one or more phases of the growth cycle of plants by conventional synthetic-resin materials, and considerable effort has been directed to developing materials which can be used as a substitute for glass in greenhouses or the like and especially for existing techniques and installations for the growth-forcing and/or protection of vegetable, flower and fruit cultivation.

It is, therefore, the principal object of the present invention to provide an improved translucent material, suitable for incorporation into existing installations, which will admit of the controlled cultivation of plants of various types.

Another object of this invention is to provide an improved enclosure material, for forming cultivation chambers in place of glass, which is more durable and less breakable and has better life-transmitting properties, for plant-growth systems, than other materials hitherto proposed for this purpose.

Still another object of my invention is an improved method of cultivating vegetables, flowers and fruits in a controlled manner.

I have now found that these objects can be obtained at relatively low cost by providing, as an enclosure or covering material for plant beds and growth chambers, a translucent vinyl-chloride-based polymer containing, in the sheet material, a major proportion of a polymeric component with at least 75% by weight chemically combined polyvinylchloride, a thermal-stabilizing component, an ultraviolet absorbing component, a plasticizing component, and at least one vinylchloride dyestuff, preferably of the phthalocyanine or azo types.

I have surprisingly discovered that compositions of the general type set forth above, wherein the several components are of a select nature, are effective for the controlled growing of plants of all types, in spite of the fact that one would normally consider a colored synthetic-resin sheet material to be practically useless and undesirable for growth forcing, controlled growing and growth protection of fruit, flowers and vegetables.

According to a further feature of this invention, the several components are constituted as follows:

(I) VINYLCHLORIDE-POLMER COMPONENT

The vinylchloride polymer component, according to this invention, consists essentially of 75% by weight of chemically combined polyvinylchloride either in the form of a homopolymer or as a copolymer of vinylchloride with one or more vinyl compounds copolymerizable therewith (e.g. vinyl acetate). It has been found that the polymeric materials which are suitable in this component for the purposes of the present invention, i.e. for enclosing plant-growth regions, are those polymers of this class which are formed by polymerizing vinylchloride along or in admixture with up to 25% by weight of monomers copolymerizable therewith in aqueous suspenion to yield polymeric material having a Fickentscher K number between 60 and 90 and, preferably, a K number of approximately 70. The polymer component may, moreover, consist of a major proportion of such vinylchloride-based homo- or copolymers in mutual admixture with a minor proportion (i.e. less than 50% by weight) of a compatible synthetic resin of the acrylic or ABS types. The latter include acrylic components with or without butadiene and styrene. The term "acrylic resin" is used herein to refer to acrylonitrile polymers and copolymers and, therefore, include polyacrylonitriles as well as ABS terpolymers (i.e. acrylonitrile-butadiene-styrene polymerized materials). The latter can be of the type which is formed in an aqueous suspension or latex of a syntheic elastomer to which is graft polymerized an acrylic monomer (i.e. acrylonitrile). Thus the acrylonitrile component of the terpolymer can be any of the substituted acrylonitriles alone or together with acrylonitrile while the styrene-based component can be styrene or a substituted styrene. Suitable polymeric materials can be obtained according to the processes described in U.S. applications Ser. No. 257,874 filed on Feb. 12, 1963, now abandoned, Ser. No. 329,952, filed on Dec. 12, 1963, now U.S. Patent No. 3,332,918 and Ser. No. 403,322 filed on Oct. 12, 1964, now U.S. Patent No. 3,406,136.

(II) THERMAL-STABILIZING COMPONENT

The thermal stabilizing component, which is incorporated in the sheet materials in an amount (total) ranging between 0.5 and 40 parts by weight per 100 parts of vinylchloride, is a mixture composed of two ingredients, i.e. a first stabilizer constituted by barium, cadmium, lead, zinc, tin or magnesium polymer-stabilizing compounds alone or on mutual admixture and a second stabilizer consisting of one or more epoxy compounds (i.e. having at least one epoxy group per molecule and containing from 22 to 150 carbon atoms per molecule).

Examples of suitable stabilizers of the first type are:

Advastab T–150; T–360; OM–18; 52; 17–M; T–290; BC–72; BC–26; BC–30; BC–206; BC–207; T–72 (Deutsche Advance Production, West Germany)
Mark 275; Q–292; XA; Q–180; LL; M; XI; TT; WSX; WSY; PC (Argus Chem. Corp., U.S.A.)
Thermolite 17; 45; 112; 166; 13 (Metal and Thermit Corp., U.S.A.)
Estabex E; Z 20; L (Noury and Van der Lande, Netherlands)
Meister Z 10; Z 21; Z24–M; M 45; M 55 (Meister A.G., Switzerland)
Stanclere 55; 80 (Pure Chemical Ltd., Great Britain)
Flomax 25; Clarite; Nalzin; Dyphos; Dythal; DS 207; Tribase; Tribase E (National Lead Co., U.S.A.)
Ferro 1237; 5001; 5011; 5002; 1212 A; 1820; 6V 10; 703; 765 A (Ferro Corp., U.S.A.)

Examples of suitable stabilizers of the second type are:

Advaplast 39; Drapex 3.2; Drapex 6.8; (Argus)
Advaplast E–98 (Deutsche Advance Prod.)
Estabex 2307; 2349 (Noury and Van der Lande)
Ferro 900; 909; 7V1; 7V2 (Ferro Corp.)
Epikote 828; 834 (Shell)
D.E.R. 1002 (Dow Chemical, U.S.A.).

(III) ULTRAVIOLET—ABSORBER COMPONENT

The ultraviolet-absorber component, which should be present in an amount ranging from 0.05 to 2 parts by weight per 100 parts by weight of vinylchloride, can be of any of the conventional U.V.-light absorbers hitherto proposed for incorporation in translucent and transparent polymeric materials. J. Darby Journ. C.E.D. October 1959, vol. 4, pages 372–378. The preferred absorbers are benzophenone, triazole and substitute benzophenones and triazoles, alone or in mutual admixture and, preferably, with at least one optical bleaching agent or bluing agent. Examples of U.V. absorbers are: UV Absorber 9 (American Cyanamid), Tinuvin P (Geigy), UV Sorba A (Ciba). An example of a bluing agent is Calco Oil Violet IRS (Am. Cyanamid). Examples of bleaching agents are: Uvitex OB (Ciba), Blancofor K 2002 (Bayer,) Calcofluor White RW (Am. Cyanamid), Tinopal PGP and Tinopal PCRC (Geigy.

(IV) PLASTICIZING COMPONENT

The plasticizing component can be constituted by one or more vinylchloride plasticizers of the phthalic type having alkyl chains of 4 to 13 carbon atoms, or other diesters or diesterifiable compounds with alkyl chains of 4 to 13 carbon atoms. These plasticizers include alkyl adipates, alkyl sebacates and alkyl azelates; inorganic-type or phosphate plasticizers such as alkyl and aryl phosphates and phosphites are also suitable.

Other plasticizing agents suitable for use in accordance with the present invention include aralkyl hydrocarbons having relatively long alkyl chains attached to ring nuclei (e.g. dodecylbenzenes-), chlorinated paraffins and like compounds commonly used heretofore as plasticizers for vinylic polymers.

(V) LUBRICATING COMPONENT

The lubricating component to be incorporated in a sheet or foil for growth-controlling techniques, according to the invention, is selected from the group consisting of the higher aliphatic acids having from 12 to 24 carbon atoms and salts of such acids with barium, cadmium, zinc, calcium and lead, such salts being formed by reacting directly or in solution the higher aliphatic acids with the oxides, hydroxides or carbonates of these metals; paraffinic waxes; polyamidic waxes; low-molecular-weight polyurethanes; silicone oils; and higher aliphatic alcohols.

The higher aliphatic alcohols and acids of the lubricating component should contain 12–24 carbon atoms, and the stearic acid, lauric acid, palmitic acid and myristic acid, the corresponding alcohols and the barium, cadmium, zinc, calcium and lead salts of these acids are the most desirable.

(VI) COLORING COMPONENT

The coloring component preferably includes one or more blue, red, violet, green or yellow dyes of the type hitherto proposed for the dyeing of vinylic polymers. It has been found to be of considerable advantage to use especially blue, red and violet sheet materials prepared in accordance with the present invention for the selective growth effects described in greater detail hereinbelow. When blue-colored sheet materials are desired, the dye is preferably of the phthalocyanine type, whereas the red dyes for use in accordance with the present invention are of the azoic type.

Preferred types of dyes are indigoid, antraquinone, phthalocyanine and indanthrene pigments. Examples of dyes are: yellow P.V. Echt Gelb-HR (Hoechst, Germany); green Cromoftal G.F. (Ciba, Switzerland); blue Blue Cromoftal G.F. (Ciba); violet Vat Violet 2/73 385 (ACNA, Italy); red Rosso Microlit BR-K (Ciba).

While fairly wide ranges of the various components can be present in the sheet materials of the present invention, I have found that, for optimum growth-control results, it is important to limit the various components to the ranges set forth below (given per 100 parts of the polymer content, e.g. 100 parts by weight of vinylchloride polymer):

| | Parts by weight |
|---|---|
| (II) thermal-stabilizing components | 0.5–40 |
| (IIa) first stabilizer | 0.5–10 |
| (IIb) second stabilizer | 0.5–30 |
| (III) ultraviolet-absorber component | 0.05–2 |
| (IV) plasticizing component | 10–100 |
| (V) lubricating component | 0.05–5 |
| (VI) coloring component | 0.00001–5 |

According to another aspect of this invention, the aforementioned components are combined in such proportions as to yield a foil or sheet material as prepared by conventional film-making methods from the composition, with the following highly important and, indeed, critical physical properties:

(1) Modulus, as measured in accordance with ASTM D882 Standard, greater than 0.3 kg./mm.$^2$.

(2) Breaking load, as measured under ASTM D882 Standard, greater than 0.7 kg./mm.$^2$.

(3) Elongation ratio, in accordance with ASTM D882 Standard, greater than 100 percent in the longitudinal direction.

(4) Elmendorf Tearing Test, ASTM D689 Standard, greater than 2000 grams per mm.

(5) Static Thermostability Test ASTM D784 Standard, no change after 200 minutes at 170° C.

(6) Stability to light (Weatherometer E 42 Test), unchanged after 1000 hours.

(7) Shore Hardness, ASTM 1706 Standard greater than 50.

When the quantity of plasticizing component is reduced to zero, it is found that the breaking load (ASTM D638 rises to 7 kg./mm.$^2$ and the elongation percent at rupture (ASTM D638) increases to 140%, while the growth-modifying power, stability to light and stability to heat are unaltered.

EXAMPLE

The following is a specific example of a preferred composition of a polymeric transparent colored material according to this invention:

| | Parts by weight |
|---|---|
| Sicron 548 (homopolymer of vinylchloride prepared by suspension polymerization parenthesis | 100 |
| Barium/cadmium thermal stabilizer (Ba/Cd ratio=1/2) | 3 |
| Epoxidized soybean oil | 5 |
| 2-hydroxy-4-methoxy-benzophenone | 0.25 |
| Dioctyl phthalate (with 0.2% bisphenol A) | 50 |
| Tricresyl phosphate | 10 |
| Stearic acid | 0.5 |
| Blue dye (phthalocyanine) | 0.1 |

The composition may be transformed into films and plates by methods commonly used in the field of the processing of plastic materials and well known to those skilled in the art; thus colored translucent films based on polymeric materials according to this invention may be prepared by extrusion of granular or powdery materials (dry blends or partially gelled) constituted by polyvinylchloride in admixture with the above-mentioned additives. This mixture, in form of powders as well as granules, is obtained by mixing, at first cold and then at a temperature of up to 120° C., the polymer and the several additives (I–VI). The mixture thus obtained by mechanical or thermal treatment is transformed into a homogeneous mass at a temperature varying from 120° C. to 180° C. (gelling) and is then introduced into a granulator, such as an extruder with a perforated heat plate provided with a rotating knife at the head of the extruder.

The granules thus obtained are then transformed into films or sheets in extruders with a suitably shaped extruding head to fit requirements.

The transparent colored thermoplastic materials of this invention have optical characteristics basically different from those of similar colorless transparent materials of equal thickness when used in place of glass; they also have improved shock resistance, lower installation costs and less weight.

These optical modifications concern both the transmittance percentage of sun radiations of various wavelengths as well as the degree of reflection and diffusion which the radiations themselves undergo when they heat the material under angles of incidence different from zero; this can be clearly seen from the accompanying drawing in which the sole figure is a graph illustrating the invention.

Curves a, b and c represent the graphs of the transmittance percentage with varying wavelength of the incident radiation respectively for a colorless transparent film of 0.2 mm. thickness, for a blue transparent film and for a red transparent film of 0.2 mm. thickness.

In appended Table 1, I show the variation of the transmittance percentage for the different wavelengths of the radiations impinging upon the material under different angles of incidence.

The values recorded in the table are determined for both red and blue films as well as for colorless films of equal thickness.

TABLE 1

| | 0° | | | 10° | | | | | |
|---|---|---|---|---|---|---|---|---|---|
| | T | | | T | | | Variations, percent | | |
| Incidences, X radiations | Blue | Red | Colorless | Blue | Red | Colorless | Blue | Red | Colorless |
| From 3,000 to 3,800 | 5.0 | 2.4 | 27.5 | 4.9 | 2.3 | 27.5 | −2.0 | −4.2 | 0 |
| From 3,900 to 4,400 | 63.4 | 22.8 | 83.6 | 62.9 | 22.5 | 83.4 | −0.8 | −1.3 | −0.2 |
| From 4,500 to 5,000 | 83.5 | 5.5 | 88.0 | 83.0 | 5.5 | 87.2 | −0.6 | 0 | −0.9 |
| From 5,200 to 5,400 | 75.0 | 0.5 | 89.0 | 75.0 | 0.5 | 88.5 | 0 | 0 | −0.6 |
| From 5,600 to 5,800 | 33.5 | 2.5 | 89.5 | 83.0 | 2.5 | 89.0 | −1.5 | 0 | −0.6 |
| From 6,000 to 6,250 | 20.5 | 65.0 | 89.5 | 20.0 | 65.0 | 89.0 | −2.4 | 0 | −0.6 |
| From 6,500 to 7,600 | 52.0 | 85.5 | 90.8 | 51.5 | 85.0 | 90.0 | −0.1 | −0.6 | −0.9 |
| From 7,700 to 12,000 | 85.6 | 89.5 | 90.8 | 85.3 | 89.1 | 90.3 | −0.4 | −0.4 | −0.6 |

| | 25° | | | | | | 50° | | | | | |
|---|---|---|---|---|---|---|---|---|---|---|---|---|
| | T | | | Variations, percent | | | T | | | Variations, percent | | |
| Incidences, X radiations | Blue | Red | Colorless | Blue | Red | Colorless | Blue | Red | Colorless | Blue | Red | Colorless[1] |
| From 3,000 to 3,800 | 4.6 | 2.1 | 26.4 | −8.0 | −12.5 | −4.0 | 3.1 | 1.4 | 15.5 | −38.0 | −41.7 | −40.4 |
| From 3,900 to 4,400 | 61.4 | 21.6 | 82.1 | −3.2 | −5.3 | −1.8 | 50.5 | 15.5 | 61.4 | 20.3 | −32.0 | −26.6 |
| From 4,500 to 5,000 | 81.8 | 5.5 | 86.7 | −2.0 | 0 | −1.5 | 70.8 | 3.8 | 67.7 | −15.2 | −30.9 | −23.1 |
| From 5,200 to 5,400 | 74.0 | 0 | 88.0 | −1.3 | −100.0 | −1.1 | 62.5 | 0 | 66.5 | −16.7 | −100.0 | −25.3 |
| From 5,600 to 5,800 | 31.0 | 2.5 | 89.0 | −7.5 | 0 | −0.6 | 23.0 | 2.0 | 70.0 | −31.3 | −20.0 | −21.8 |
| From 6,000 to 6,250 | 19.0 | 64.5 | 89.0 | −7.3 | −0.8 | −0.6 | 13.5 | 56.0 | 70.5 | 34.1 | −13.8 | −21.2 |
| From 6,500 to 7,600 | 50.0 | 84.2 | 89.8 | −3.8 | −1.5 | −1.1 | 40.7 | 71.8 | 71.2 | −21.7 | −16.0 | −21.6 |
| From 7,700 to 12,000 | 84.4 | 88.2 | 89.9 | −1.4 | −1.5 | −1.0 | 72.1 | 75.5 | 71.5 | −15.8 | −16.1 | −21.3 |

[1] Colorless film prepared for comparison.

It has been surprisingly found that the colored polymeric materials of the present invention, when used in the form of films or plates for the covering of greenhouses or of other growth-forcing and protective installations for vegetable, lower and fruit cultivations of similar compositions and in the same thickness, are characterized by thermal properties clearly differentiated with respect to a colorless transparent polymeric material in the sense that the coloration turns out to be uniquely capable of modifying the degree of the so-called "greenhouse effect" which can be caused by the transparent material.

In fact, from measurements of the temperature in 12 small greenhouses, grouped into 4 sets of three greenhouses each, completely covered with films of transparent polymeric material of blue tint, of red tint and colorless (for comparison), results were obtained which are recorded on the following table:

TABLE 2.—DAY-TIME TEMPERATURE, MAXIMUM AND MINIMUM
[General mean values for the period 10 January 1965 to 20 June 1965]

| | Mean temperature | | |
|---|---|---|---|
| | Colorless film, °C. | Blue film, °C. | Red film, °C. |
| Daytime | 15.62 | 15.43 | 15.22 |
| Maximum | 37.40 | 38.10 | 36.64 |
| Minimum | 3.92 | 3.86 | 3.93 |

From Table 2 it can be seen that the use of colored transparent polymeric materials according to the invention, while not creating significant variations with regard to the daytime mean temperature and the mean of the minimum temperatures, provides, a significant variation in the value of the maximum mean temperature with respect to the use of colorless transparent polymeric material of the same composition and of the same thickness.

In the same way, on the basis of measurements of the average degree of relative humidity, it was surprisingly found that the use of colored transparent polymeric materials, according to this invention, involves a variation of the average degree of relative humidity in the greenhouses in comparison with the use of colorless transparent polymeric materials of the same composition and thickness.

The data obtained in the same greenhouses used for the determination of the temperatures and for the same period are recorded in the following table:

TABLE 3

| | Mean relative humidity, percent |
|---|---|
| Colorless transparent film | 75.76 |
| Blue transparent film | 77.75 |
| Red transparent film | 78.08 |

It can be seen that the use of transparent polymeric material of red or blue color, according to the invention, involves a variation of the mean relative humidity with respect to a colorless transparent material of the same composition and equal thickness.

This fact, in the case of cultivations of ornamental plants to be carried out in heated greenhouses, represents a considerable advantage. The improved mechanical, optical and thermal characteristics typical of the colored transparent polymeric material of this invention make it possible to use the material in the form of sheets or films in growth-forcing and protective installations for hartifloral cultivations in general, such as for instance in the covering of greenhouses, in the building of various semi-forcing and protective installations for cultivations, such as tunnels, penthouses, hoods and, the like, and finally, in the mulching of soil.

The following numerical data show the influence exerted on the development and on the results of a tomato cultivation in a greenhouse in which the walls and the roof were constituted by colored films of the transparent polymeric materials of this invention.

More particularly for this purpose transparent red, blue and colorless films (for comparative purposes) were used of polyvinylchloride having the above-reported characteristics. With each of the three materials, four greenhouses were covered in which was conducted an extra-seasonal cultivation of table tomatoes (Supermarmande) by transplanting, on the same date, 12 tomato plants.

For all the greenhouses the cultivation technique was strictly the same. At the end of the cultivation the total weight, the number and average unit weight of the picked fruit and their average ripening period were ascertained. The values obtained were recorded in the following table:

TABLE 4

| Type of covering | Mean total weight of fruit per greenhouse in kg. | Mean total number of fruit per greenhouse | Mean unit weight of fruit per gram | Mean ripening period in days |
|---|---|---|---|---|
| Colorless film | 20.020 | 203 | 99 | 36.5 |
| Blue film | 10.364 | 131 | 79 | 38.6 |
| Red film | 14.315 | 156 | 92 | 42.9 |

From the above, it can be perceived that with regard to the fructification of the tomato plants (reproductive phase) the use of the two colored transparent materials depresses the fructification, wherefor this characteristic may be advantageously exploited when it is desired to retard fructification.

In the following table, I have recorded the data concerning the mean total weight of the tomato plants at the end of the cycle, and the data relative to the average height of the plants themselves as ascertained after 60 days from the transplantation.

TABLE 5

| Type of cultivation | Mean total weight of the plants at the end of the cycle in kg. | Mean height of the plants after 60 days from the transplant in cm. |
|---|---|---|
| Colorless film | 3.275 | 11.3 |
| Red film | 3.750 | 11.2 |
| Blue film | 2.475 | 13.7 |

From the above data it will be seen that the red covering materials exert a considerable promotional action on the average total weight of the plants at the end of the cycle, while the blue covering material on its part promotes increases in the average height of the plants.

The results of another test are summarized in the following table giving the data concerning the number of flowers and the amount of strawberries (species Talesman, number of plants=44, cultivated area=10.4 sq. m.) collected when tunnels of transparent colorless and violet film (both 0.15 mm. thick) of the polymeric composition according to the present invention are used.

TABLE 6

| | Number of flowers | |
|---|---|---|
| Date | Colorless film | Violet-tint film |
| March 25, 1965 | 91 | 179 |
| March 28, 1965 | 197 | 345 |
| April 1, 1965 | 384 | 721 |
| April 4, 1965 | 592 | 1,403 |
| April 8, 1965 | 1,000 | 2,326 |
| April 11, 1965 | 1,616 | 3,288 |
| Total | 3,980 | 8,262 |

TABLE 7

| | Strawberries collected in kg. | |
|---|---|---|
| Date | Transparent (colorless) | Violet |
| April 29, 1965 | 0.015 | 0.070 |
| April 30, 1965 | 0.100 | 0.110 |
| May 3, 1965 | 0.425 | 0.560 |
| May 4, 1965 | 0.470 | 0.390 |
| May 6, 1965 | 0.750 | 0.810 |
| May 9, 1965 | 1.040 | 0.970 |
| May 11, 1965 | 1.515 | 2.440 |
| May 13, 1965 | 2.460 | 2.900 |
| Total | 6.775 | 8.250 |

From these data, the considerable influence exerted by the violet film is evident especially by comparison with the results obtained when using colorless film of the same thickness and composition.

Other tests were also carried out in order to establish which influence is exerted on the health conditions of the plants by the colorless coloring materials based on the polymeric compositions of this invention, in comparison to similar colorless materials.

The observations in this connection established surprisingly, that the percentage of plants suffering from virosis was the following:

Plants suffering from virosis

| | Percent |
|---|---|
| Colorless film | 100 |
| Blue film | 89.6 |
| Red film | 50.0 |

From this it clearly appears that the serious infection from virosis may be restrained or controlled by making use of red-tinted covering material.

From the foregoing example and tests, it is evident that the color-tinted synthetic-resin films or sheets may be employed merely by their substitution for pre-existing glass panes in greenhouses or the like as well as by placing the sheets on frames or loosely over plant cultivations whose growth is to be modified. It is indeed surprising that merely by modifying the coloration of the sheet material, e.g. by interchanging red and blue foils, or by substituting the foils selectively above a glass or openwork support, the humidity can be controlled to fractions of a percent and any particularly disadvantageous radiation absorbed.

The invention described and illustrated is believed to admit of many modifications within the ability of persons skilled in the art, without departing from the spirit and scope of the appended claims.

I claim:

1. A growth-controlling plant enclosure of translucent tinted polymeric sheet material composed essentially of:
   (I) a vinylchloride-polymer component consisting essentially of at least 75% by weight chemically combined vinylchloride and having a Fickentscher K number between substantially 60 and 90, formed by suspension homopolymerization of vinylchloride;
   (II) a thermal-stabilizing component consisting essentially of a mixture of a first ingredient from the group of barium, cadmium, lead, zinc, tin and magnesium thermal stabilizers and a second ingredient from the group of organic thermal stabilizers of high molecular weight with at least one epoxy group per molecule;
   (III) an ultraviolet-absorber component;
   (IV) a plasticizing component from the group of phthalic, adipic, sebacic, and azelaic acids, alkyl mono- and di-esters thereof, alkyl, aryl, and aralkyl phosphates and phosphites, alkylaryl hydrocarbons of long carbon chain, and chlorinated paraffins;
   (V) a lubricating component selected from the group consisting of aliphatic acids and their barium, cadmium, zinc, calcium and lead salts, paraffinic waxes, polyamidic waxes, low-molecular-weight polyethylenes, silicone oils, mineral oils, aliphatic alcohols having 12 to 24 carbon atoms; and
   (VI) at least one light-transmissivity-modifying polymer-coloring dye for imparting blue, red, yellow, violet or green tint to said composition, said dye being present in an amount ranging between 0.00001 and 5 parts by weight per 100 parts by weight of said vinylchloride-polymer component; said components I through V being each present in an amount and proportion such that said sheet material has the following physical properties:
   (1) modulus, as measured in accordance with ASTM D882 Standard, greater than 0.3 kg./mm.²;
   (2) breaking load, as measured under ASTM D882 Standard, greater than 0.7 kg./mm.²;
   (3) elongation ratio, in accordance with ASTM D882 Standard, greater than 100 percent in the longitudinal direction;
   (4) Elemendorf tearing test, ASTM D689 Standard, greater than 2000 grams per mm.;
   (5) static thermostability test ASTM D784 Standard, no change after 200 minutes at 170° C.;
   (6) stability to light (Weatherometer E 42 test), unchanged after 1000 hours; and
   (7) Shore Hardness, ASTM 1706 Standard, greater than 50.

2. The enclosure defined in claim 1 wherein each of said components II–V is present in the following proportions:

| | Parts by weight |
|---|---|
| (II) Thermal-stabilizing component | 0.5–40 |
| (III) Ultraviolet absorber component | 0.5–2 |
| (IV) Plasticizing component | 10–100 |
| (V) Lubricating component | 0.5–5 |

3. The enclosure defined in claim 2 wherein said plasticizing component is selected from the group which consists of alkyl phthalates, alkyl adipates, alkyl sebacates and alkyl azelates having alkyl groups containing from 4 to 13 carbon atoms.

4. The enclosure defined in claim 2 wherein said first ingredient is present in an amount ranging from 0.5 to 10 parts by weight and said second ingredient is present in an amount ranging from 0.5 to 30 parts by weight.

5. The enclosure defined in claim 4 wherein said second ingredient includes epoxy esters having from 22 to 150 carbon atoms per molecule.

6. In a plant enclosure, a sheet material composed essentially of:
   (I) a vinylchloride-polymer component consisting essentially of at least 75% by weight chemically combined vinylchloride and having a Fickentscher K number of about 70, formed by suspension homopolymerization of vinylchloride;
   (II) a thermal-stabilizing component consisting essentially of a mixture of a first ingredient from the group of barium, cadmium, lead, zinc, tin and magnesium thermal stabilizers, and a second ingredient from the group of organic thermal stabilizers of high molecular weight with at least one epoxy group per molecule;
   (III) an ultraviolet-absorber component;
   (IV) a plasticizing component from the group of phthalic, adipic, sebacic, and azelaic acids, alkyl mono- and di-esters thereof, alkyl, aryl, and aralkyl phosphates and phosphites, alkylaryl hydrocarbons of long carbon chain, and chlorinated paraffins;
   (V) a lubricating component selected from the group consisting of aliphatic acids and their barium, cadmium, zinc, calcium and lead salts, paraffinic waxes, polyamidic waxes, low-molecular-weight polyethylenes, silicone oils, mineral oils, aliphatic alcohols having 12 to 24 carbon atoms; and
   (VI) at least one light-transmissivity-modifying polymer-coloring dye for imparting blue, red, yellow, violet or green tint to said composition, said dye being present in an amount sufficient to impart to a 2 mm. film of the sheet material a light-transmissivity percentage characteristic with frequency as shown in curves b and c of the figure, said components I through V being each present in an amount and proportion such that said sheet material has the following physical properties:
   (1) modulus, as measured in accordance with ASTM D882 Standard, greater than 0.3 kg./mm.²;
   (2) breaking load, as measured under ASTM D882 Standard, greater than 0.7 kg./mm.²;
   (3) elongation ratio, in accordance with ASTM D882 Standard, greater than 100 percent in the longitudinal direction;
   (4) Elemendorf tearing test, ASTM D689 Standard, greater than 2000 grams per mm.;
   (5) static thermostability test ASTM D784 Standard, no change after 200 minutes at 170° C.;
   (6) stability to light (Weatherometer E 42 test), unchanged after 1000 hours; and
   (7) Shore Hardness, ASTM 1706 Standard, greater than 50.

7. A sheet material as defined in claim 6 wherein each of said components and said dye are present in the following proportions:

| | Parts by weight |
|---|---|
| (I) Vinylchloride polymer component | 100 |
| (II) Thermal stabilizing component | 0.5–40 |
| (III) Ultravinyl absorber component | 0.5–2 |
| (IV) Plasticizing component | 10–100 |
| (V) Lubricating component and | 0.5–5 |
| (VI) Dye—0.00001 to 5. | |

(References on following page)

References Cited

UNITED STATES PATENTS

| | | | |
|---|---|---|---|
| 2,639,550 | 5/1953 | McKee | 47—17 |
| 3,043,709 | 7/1962 | Amborski | 47—17 |
| 3,352,058 | 11/1967 | Brant | 47—17 |

FOREIGN PATENTS

| | | |
|---|---|---|
| 24,939 | 10/1935 | Australia. |
| 880,629 | 10/1961 | Great Britain. |
| 914,407 | 1/1963 | Great Britain. |

ALLAN LIEBERMAN, Primary Examiner

U.S. Cl. X.R.

45—17, 58; 260—28.5, 30.6, 31.8, 33.6, 33.8, 41, 45.7, 45.95